May 22, 1928.
L. B. SPERRY
1,670,641
MECHANICALLY PILOTED DIRIGIBLE DEVICE
Original Filed April 18, 1918    4 Sheets-Sheet 1
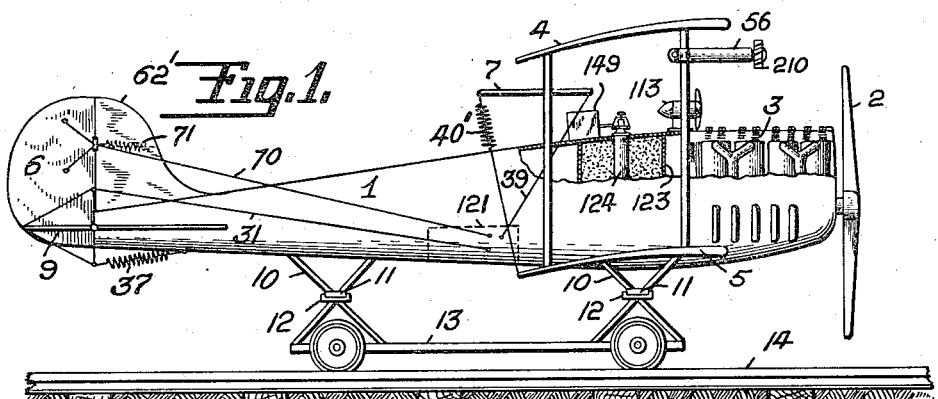
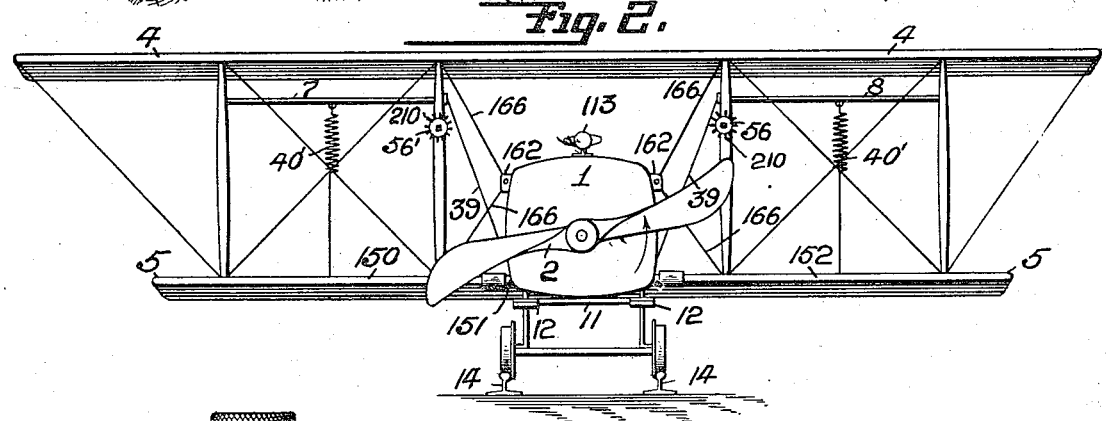
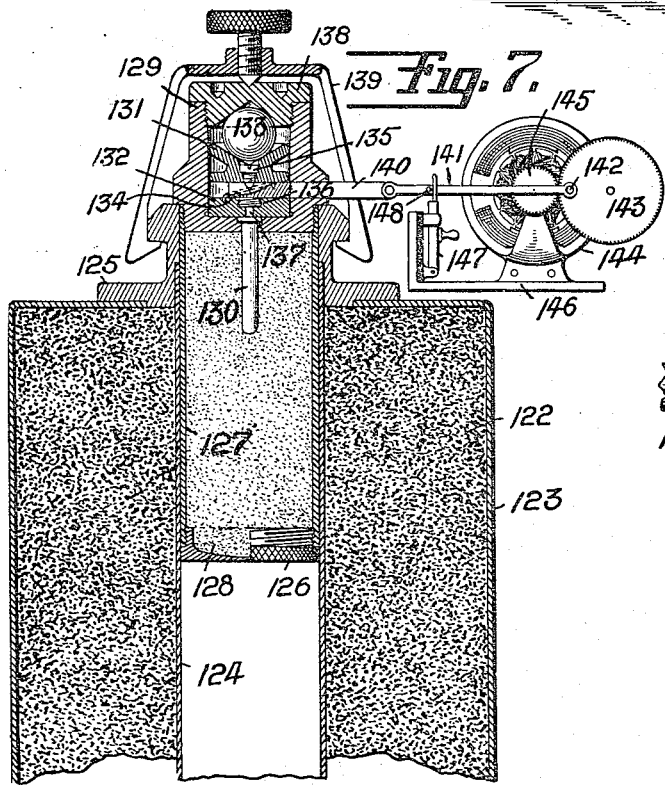
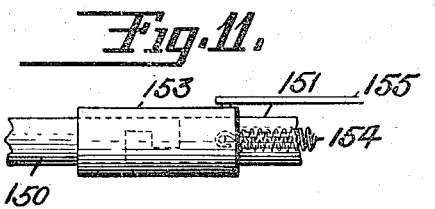
INVENTOR
LAWRENCE B. SPERRY
BY
Herbert H. Thompson
ATTORNEY

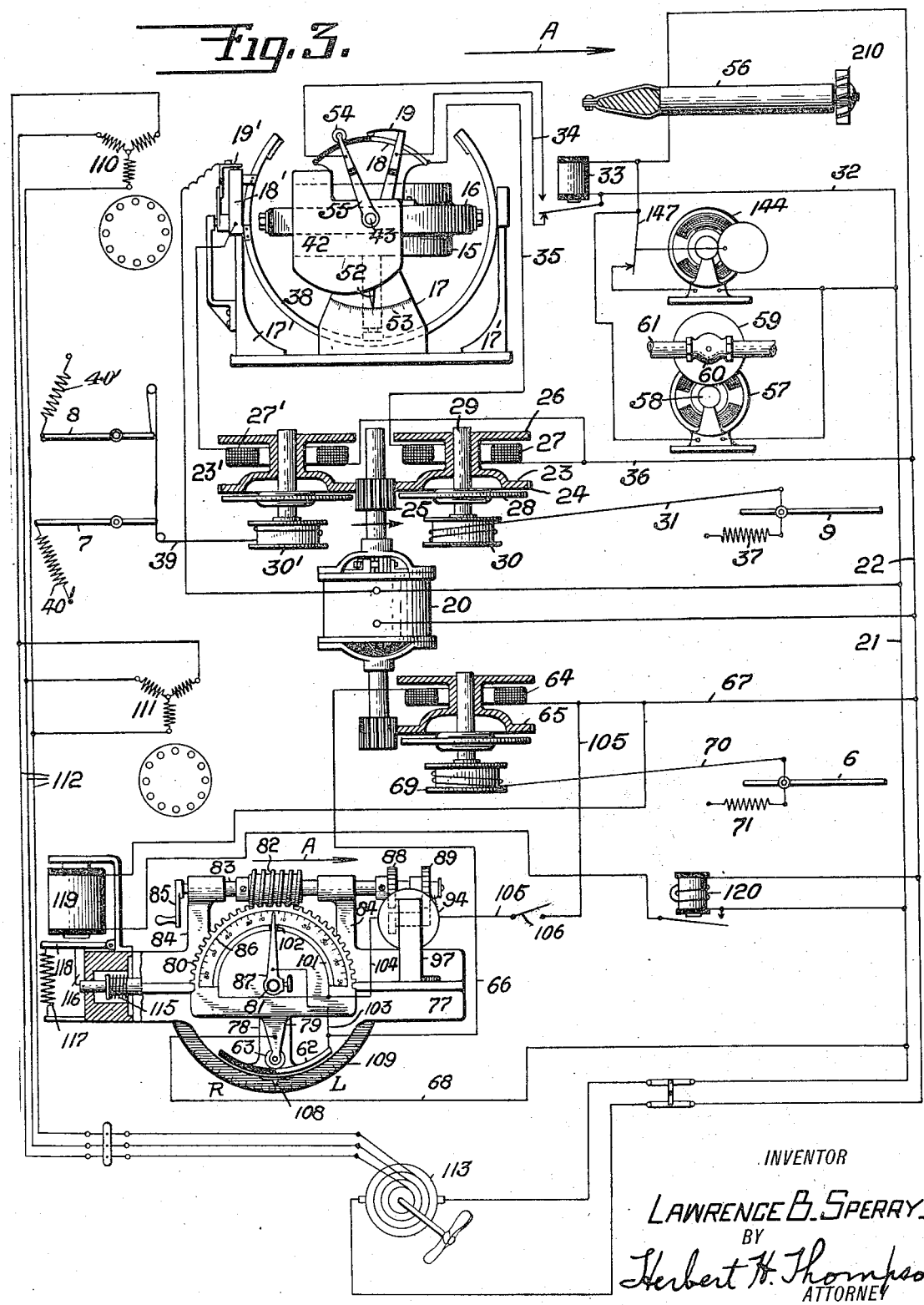

May 22, 1928. 1,670,641
L. B. SPERRY
MECHANICALLY PILOTED DIRIGIBLE DEVICE
Original Filed April 18, 1918  4 Sheets-Sheet 3
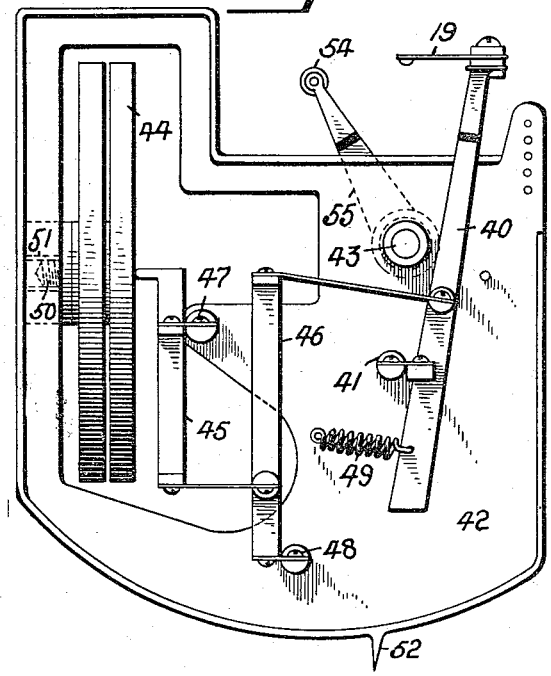
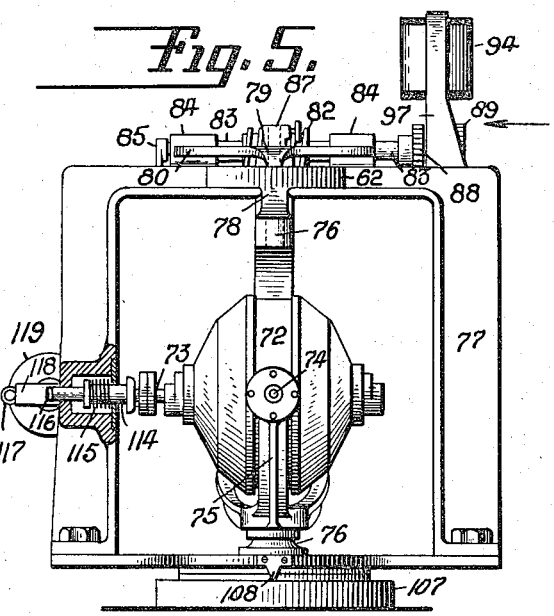
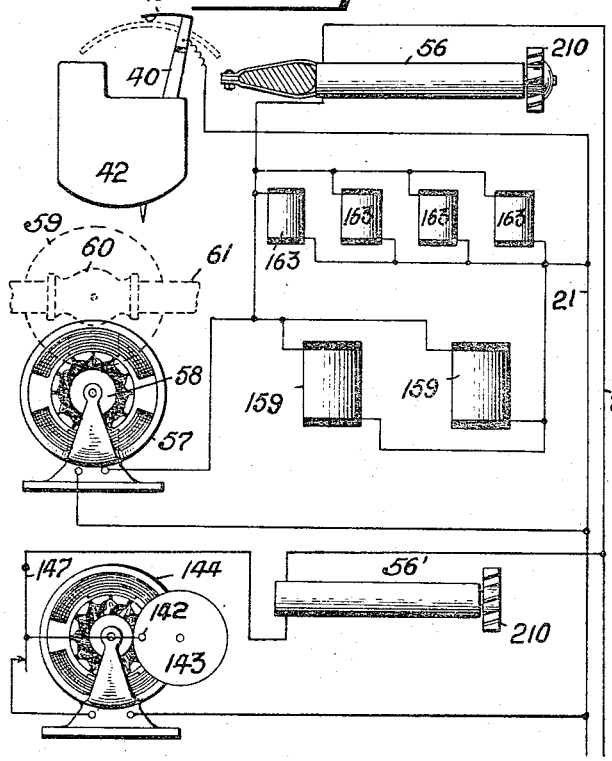
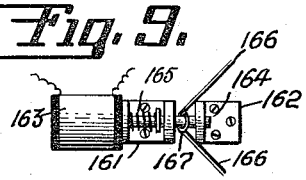
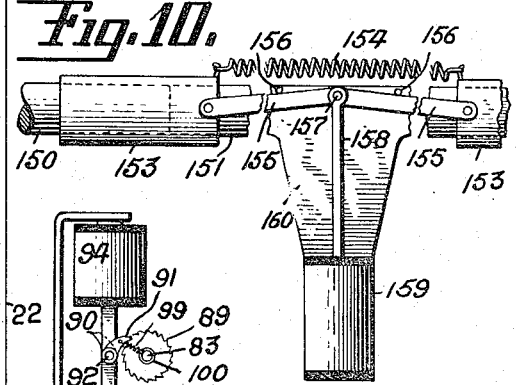
INVENTOR
LAWRENCE B. SPERRY
BY
Herbert H. Thompson
ATTORNEY May 22, 1928.                                                1,670,641
                           L. B. SPERRY
                MECHANICALLY PILOTED DIRIGIBLE DEVICE
              Original Filed April 18, 1918    4 Sheets-Sheet 4
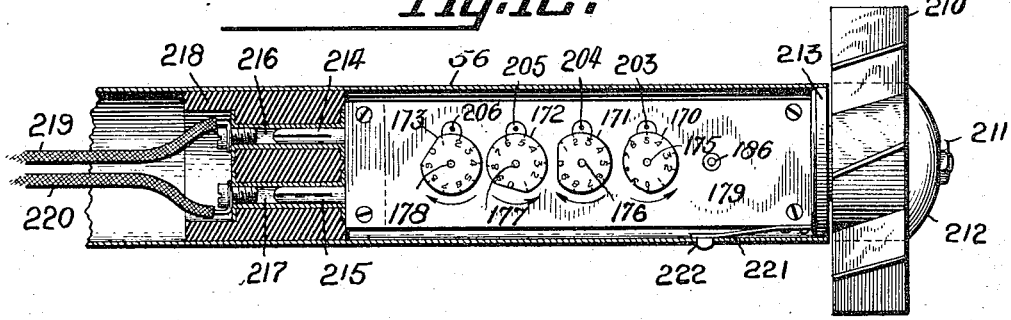
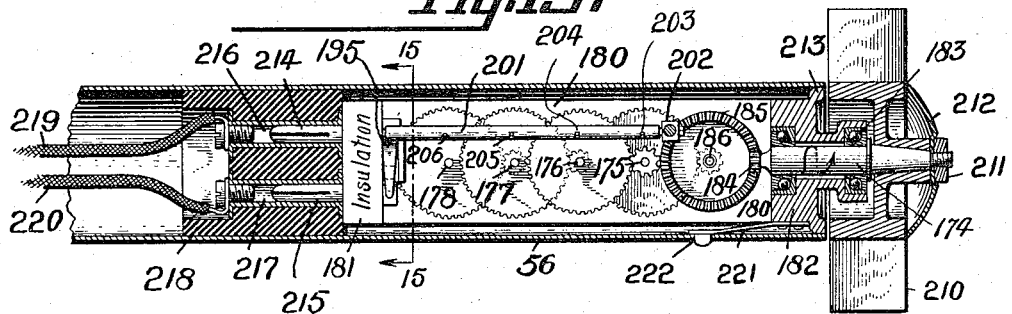
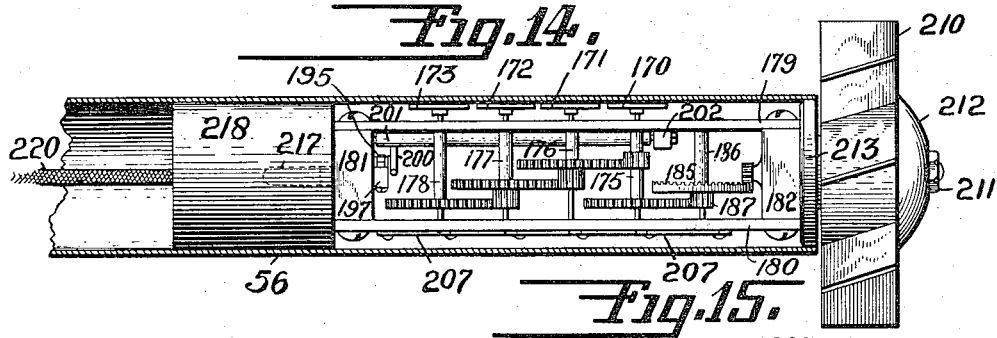
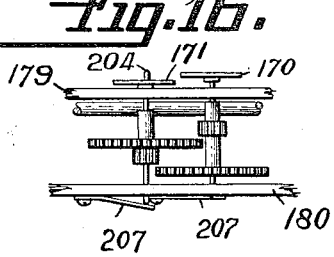
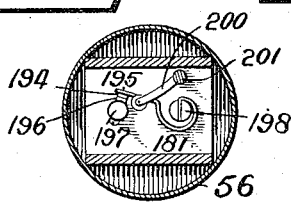
Inventor
LAWRENCE B. SPERRY
By his Attorney
Herbert H. Thompson Patented May 22, 1928.

1,670,641

UNITED STATES PATENT OFFICE.

LAWRENCE B. SPERRY, OF MASSAPEQUA, NEW YORK, ASSIGNOR TO THE SPERRY GYROSCOPE COMPANY, OF BROOKLYN, NEW YORK, A CORPORATION OF NEW YORK.

MECHANICALLY-PILOTED DIRIGIBLE DEVICE.

Application filed April 18, 1918, Serial No. 229,466. Renewed October 10, 1927.

This invention relates generically to self-stabilizing dirigible devices, more specifically, to self-stabilizing aeroplanes and in its most specific aspect to aerial torpedoes of the aeroplane type.

The primary object of the present invention is to provide a stabilizing system for dirigible devices, particularly aeroplanes, in which no follow-up need be employed.

Another and important object is to reduce materially the number of parts, and consequently the weight thereof, employed in stabilizing systems for devices of the class above mentioned.

A further object is to provide improved means for automatically changing the course of an aerial torpedo.

A further object is to provide means for rendering the propelling means of an aerial torpedo inoperative after the latter has traveled a predetermined distance.

A still further object is to provide means for causing the body of an aerial torpedo to drop away from its supporting planes after the torpedo has traveled a predetermined distance. Further objects and advantages will appear as the invention is hereinafter developed.

Referring to the drawings which illustrate what I now consider the preferred forms of my invention:

Fig. 1 is a side elevation, partly broken away, of an aerial torpedo embodying my invention.

Fig. 2 is a front elevation of the torpedo shown in Fig. 1, with certain modifications.

Fig. 3 is a partly diagrammatic view illustrating the mechanical and electrical connections of one form of my invention.

Fig. 4 is a detail elevation of one form of elevation control device.

Fig. 5 is an elevation of the azimuth control gyro shown in plan in Fig. 3.

Fig. 6 is a detail elevation of a part of the mechanism shown in Fig. 5, looking in the direction of the arrow in the last mentioned figure.

Fig. 7 is a detail sectional elevation of the explosive charge carried by the torpedo together with the firing and arming means therefor.

Fig. 8 is a partly diagrammatic view illustrating certain changes in the system shown in Fig. 3 in order to adapt the latter for use in connection with the modification illustrated in Fig. 2.

Figs. 9, 10 and 11 are details of one form of mechanism employed for causing the body of the torpedo to separate from the supporting plane, Fig. 10 being a plan and Fig. 11 an elevation.

Fig. 12 is a fragmentary plan view partly in section of one form of distance responsive controller which may be used in connection with my invention.

Fig. 13 is a similar view with the top cover plate of the controller removed.

Fig. 14 is an elevation partly in section of the structure shown in Fig. 12.

Fig. 15 is a section taken on line 15—15 of Fig. 13.

Fig. 16 is a detail elevation of a part of the mechanism of Fig. 12.

While certain features of my invention are capable of broader application, as, for example, in connection with an aeroplane, automobile torpedo or other dirigible device, I have restricted the present disclosure to an aerial torpedo of the general type illustrated in my co-pending application, now matured into Patent No. 1,418,605, dated June 6, 1922, for aerial torpedoes.

Referring to Figs. 1 and 2 it will be seen that the torpedo illustrated comprises a body or fuselage 1, propeller 2, engine 3, main or supporting planes 4, 5 and control planes comprising rudder 6, ailerons 7, 8 and elevators 9. While the usual chassis may be employed I prefer to dispense with this structure and launch my torpedo either from a catapult or by means of an arrangement such as that illustrated in Figs. 1 and 2. The fuselage 1 is shown as having secured thereto a plurality of brackets 10 carrying cross-pieces 11 adapted to rest in channel members 12 of a launching truck 13. By providing rails on which the launching truck may run it will be seen that the torpedo may be directed with accuracy.

Means for stabilizing the torpedo about both horizontal axes are provided and although follow-up connections have been heretofore considered indispensable in practically operative aeroplane stabilizing systems I have discovered that such follow-up connections may be dispensed with if the system is constructed substantially as hereinafter described. Furthermore, it will be seen that in the herein disclosed system I dispense with parts and connections in addition to those above mentioned.

Referring to Fig. 3 it will be seen that I employ a gyroscopically stabilized pendulum 15 pivoted for oscillation about a horizontal axis, parallel to the longitudinal axis of the torpedo, in the gimbal ring 16. The latter is pivoted for oscillation about a horizontal axis, at right angles to the first mentioned axis, in the brackets 17. The pendulum 15 is shown in elevation in Fig. 3, the arrow A representing the line of flight of the torpedo. The ring 16 is shown as carrying at one side a contact member or segment 18 which is thus stabilized about the transverse axis. The segment 18 together with a cooperating contact 19, carried by one of the brackets 17 in a manner hereinafter more specifically described, may be utilized to control stabilization of the torpedo 1 about the transverse axis through any suitable servo motor.

In my prior application I disclosed a wind-driven servo-motor and although such a motor might be employed in the present disclosure I have illustrated an electric motor 20. While this motor 20 might be so connected as to be energized only when the gyro controlled contacts are closed I prefer to connect it across the line 21, 22 permanently in order to render the system sensitive and quickly responsive. The motor 20 may drive a clutch member 23 through a pinion 25 on the motor shaft which meshes with teeth 24 provided on said clutch member. The last mentioned member is also provided with an armature portion 26 adapted to be attracted by the solenoid 27 when the latter is energized thus causing the member 23 to engage and drive the clutch disc 28. The shaft 29 on which the disc 28 is secured has also secured thereon a drum or reel 30 around which one end of a cord or cable 31 is wrapped, the other end of said cable being secured to the elevator 9. The energization of solenoid 27 may be controlled by the contacts 18—19 in any suitable manner as for example by means of the circuit: from line wire 21, through conductor 32, back contacts of relay 33, conductor 34, contact 19, segment 18, wire 35, solenoid 27 and conductor 36 to line wire 22.

The torpedo 1 may be so designed as to have an inherent tendency to nose-dive or this bias may be obtained by securing a spring or other resilient member 37 at one end to the elevator 9 and at the other end to the fuselage as shown. Assuming that the parts thus far described are in the position shown in Fig. 3 the operation may be described as follows. The contacts 18—19 are in engagement so that the solenoid 27 will be energized to cause drum 30 to be revolved to tilt the elevator 9 to send the torpedo upwardly. As soon as the torpedo responds to this tilting of the elevator the contact 19 is disengaged from segment 18 thereby freeing the clutch disc 28 and the machine starts downwardly until the contacts 18 and 19 reengage. By virtue of this structure the torpedo will continuously hunt back and forth about the transverse axis between positions slightly above and below a horizontal plane. I have found that with this arrangement the torpedo is effectively stabilized about the transverse axis without the use of any follow-up.

Assuming that the propeller 2 is rotating (counter-clockwise) in the direction of the arrow in Fig. 2, it will be seen that by virtue of the resulting rotating column of air behind said propeller the aircraft will be given a tendency to turn about its longitudinal axis in a counter-clockwise direction. On the other hand the reactive thrust due to rotating the propeller tends to rotate the torpedo in a clockwise direction. Assuming that the latter predominates it will be clear that the torpedo will be biased, or have an inherent tendency, to turn about the longitudinal axis in a clockwise direction. By providing contacts 18', 19' which will engage when the torpedo moves off an even keel in the direction of its bias and which will break contact when the torpedo is on a substantially even keel the torpedo may be stabilized about the longitudinal without the use of a follow-up. Contact segment 18' which may be stabilized about the longitudinal axis by being secured to the bail 38 and the contact 19', which may be carried by the bracket 17' may control rotation of the drum 30' in a manner similar to the control of drum 30 by contacts 18, 19 similar elements being designated by the same numerals with a prime added. A cable 39 wound around the drum 30' at one end and connected to ailerons 7 and 8 at its other end may be provided for causing the aircraft to be rotated about the longitudinal axis, in a direction contra to its bias, when the contacts 18'—19' are closed and the drum 30' rotated by the motor 20. Springs or other resilient means 40' may be connected to either or both ailerons 7 and 8 and to the main plane structure for aiding the inherent bias of the aircraft about the longitudinal axis. The operation of the stabilization system about the fore and aft or longitudinal axis is similar to that described for stabilizing about the transverse axis, the aircraft being caused to hunt continuously about said longitudinal axis.

It will be noted that I effect the stabilization about both horizontal axes without the use of any follow-up and that the number of servo-motor clutch elements and connecting cables is practically halved. I wish to emphasize that the above described stabilizing system is capable of use on dirigible devices other than aerial torpedoes, as for example on ordinary manually piloted aeroplanes.

While the ascent, leveling off and height control of the torpedo may be effected as disclosed in my prior application, the structure may be greatly simplified by controlling the position of the contact 19 directly by means of the barometric or other height responsive device. This may be accomplished in various ways, the structure which is illustrated in Figs. 3 and 4 being preferred at present. The contact 19 is shown secured to a lever 40 pivoted at 41 on a casing 42 adjustably pivoted at 43 on one of the brackets 17. The height responsive device which is shown in the form of a barometric device 44 is carried by the frame 42 and is adapted, on expansion, to move the contact 19 to the left through the link connected levers 45, 46 and 40. The levers 45 and 46 are shown pivoted respectively at 47 and 48 to the casing or frame 42 and the lever 40 is provided with a spring 49 which tends to move the contact 19 to the right. The device 44 is shown adjustably secured to the frame or casing 42 by being provided with a screw-threaded stud 50 which screws into a tapped opening 51 in said frame. The latter is also shown provided with a pointer 52 adapted to cooperate with a scale 53 provided on bracket 17.

Assuming that the parts are in the position shown in Fig. 3 and it is desired to cause the torpedo to rise the contact 19 should be shifted to the right; by adjusting device 44 with respect to casing 42, or the latter with respect to bracket 17, or both; an angular extent equal to the initial climbing angle desired. When launched the torpedo will start to climb at the angle for which it was set. This angle will be constantly diminished by shifting of contact 19 to the left, due to the expansion of the device 44 as the torpedo rises, until the said contact 19 reaches the position illustrated in Fig. 3 in which the torpedo will pursue a substantially level course. Obviously if the torpedo should materially drop below or rise above this level course the device 44 will again act to bring it back to the proper predetermined elevation. It will be seen that with the above described structure the course of the torpedo in rising will be a gradual long radius curve.

If the preliminary adjustment of contact 19 is effected by shifting the casing 42 about the pivot 43 the scale 53 may be calibrated to indicate the initial angle of ascent when read in conjunction with the pointer 52. Furthermore, as the height to which the torpedo will rise before leveling off is a function of the initial angular deflection of contact 19, the scale 53 may, if desirable, be calibrated to indicate the elevation at which the torpedo will level off.

As in my prior application I provide means for causing the torpedo to descend after it has traveled a predetermined distance and while this might be accomplished by shifting the contact 19, I prefer to show in this application an auxiliary contact 54 and means for cutting out contact 19 and cutting in contact 54 at the desired time. The contact 54 is carried by an arm 55 adjustably secured to the stud 43, which, as previously described, is fixedly secured to one of brackets 17. The contact 54 is connected to the front contacts of the relay 33 which is normally deenergized and adapted to be energized on closure of the windwheel-driven distance responsive switch 56 connected in series therewith across line 21, 22. While various forms of distance responsive switches may be employed I prefer to employ one of the type disclosed in Figs. 12 to 16 and comprises a plurality of members 170, 171, 172, 173, rotatably mounted and adapted to be driven by a rotatable element 174 through any suitable gearing. The rotatable mounting of said members 170 to 173 may be effected by mounting them on the projecting ends of shafts 175 to 178, respectively, each rotatably mounted in plates 179 and 180 secured to end plates 181 and 182.

The element or shaft 174, which is shown journalled in ball bearings 183 in plate 182 may be provided with a pinion 184 secured thereto and adapted to mesh with a crown wheel 185 secured to a shaft 186 journalled in plates 179 and 180. The shaft 186 may also have secured thereto a pinion 187 adapted to mesh with a gear secured to shaft 175 and similar gearing may be provided between the shafts 175—176, 176—177, and 177—178.

The members 170 to 173 are utilized to control the actuation of a normally open switch comprising a contact 194 carried by a spring arm 195 and thereby biased toward a contact 196, the latter and the arm 195 being carried by terminal posts 197, 198, respectively, mounted in plate 181, which is preferably constructed of insulating material. The contact 194 is normally held away from contact 196 by a roller 199, of ivory or other suitable material, engaging arm 195 and carried by arm 200 secured to a rock shaft 201.

The rock shaft 201, which is journalled at one end in plate 181 and its other end in a bracket 202 secured to plate 179, is provided with a plurality of pins 203 to 206 projecting upwardly through openings in the plate 179 and each adapted to engage the peripheral edge of a corresponding one of members 170 to 173 which are made substantially circular. The members 170 to 173 are each shown as provided with a cut-away portion and the design of the parts is such that the contact 194 is held away from contact 196 against the action of the spring 195 unless the cut-away portion of each of members 170 to 173 is adjacent its corresponding pin 203, 204, 205, or 206. Furthermore, in order to reduce friction, preferably the parts are so arranged that when pin 206 is in engagement with the uncut portion of its disc 173 the remaining pins 203 to 205 will not engage their discs and when 205 passes the uncut portion of its disc 172 the preceding pins 204 and 203 will not engage their discs, etc.

For a purpose which will hereinafter appear, members 170 to 173 are adjustable with respect to each other and with respect to their pins 203 to 206. This may be accomplished by mounting shafts 175 to 178 slidably in plates 179 and 180 and providing springs 207 secured to lower plate 180 for supporting the lower ends of said shafts. Each of shafts 175 to 178 may, by this construction, be depressed a sufficient amount in an axial direction against the action of a corresponding one of springs 207 to cause the gear on the depressed shaft to disengage the immediately preceding pinion. The depressed member may then be rotated without causing rotation of the preceding member and on release of the former the corresponding one of springs 207 will cause the gears to reengage.

For the purpose of aiding in adjusting the device for operation at any predetermined number of revolutions each of the members 170 to 173 may be divided into a number of equal scale divisions progressing in the intended direction of rotation of the corresponding member. It will be seen that each of the said members 170 to 173 is shown provided with ten equi-angularly spaced divisions numbered 0 to 9 adapted to be read in conjunction with a reference line on a corresponding one of pins 203 to 206. It will be noted that the cut-away portions are so arranged on members 170 to 173 that the pins 203 to 206 will assume the inner position when the zeros on said members register with the lines on said pins. Furthermore, the member 170 is cut away slightly more than the other members, on the 9 side of 0 to permit the switch 194, 196 to remain closed an appreciable length of time.

Assuming that the shaft 174 is adapted to be rotated in the direction of the arrow in Fig. 13, that the gear ratio between shafts 174—186, 186—175, 175—176, 176—177, and 177—178, is one to ten and that dials 170 to 173 are set on zero positions, the operation of the distance responsive controller is as follows: If it is desired to cause the switch 194, 196 to close after the shaft 174 has made, say 86,930 revolutions, the dial 173 should be depressed and the numeral 8 caused to register with the line on pin 206 and said dial should then be released. The members 172, 171, and 170 should then be successively set on numerals 6, 9, and 3, respectively, in a similar manner. When the shaft 174 has made 86,930 revolutions the cut-away portions on discs 170 to 173 come opposite pins 203 to 206 and permit the latter to move inwardly, i. e. in the direction of the arrow in Fig. 1, thus permitting closure of the switch 194—196. Obviously the device may be set to cause closure of said switch after any desired number of revolutions of shaft 174 between the limits of 10 and 99,990 revolutions for the structure shown. Care should be taken to rotate each disc during the adjusting or setting operation in a direction opposite to its direction of rotation by the shaft 174. The dials should, furthermore, be placed on zero position before any setting is made.

The shaft 174 is shown as driven by a windwheel 210 detachably secured thereto by means of nut 211 screwed on the end of said shaft. A curved shell 212 may be provided between the nut 211 and wheel 210 as shown in order to reduce the air resistance to a minimum. The wheel 210 may be made of such pitch as to rotate one revolution when moved forward one yard, in which case the setting of members 170 to 174 will indicate tens, hundreds, thousands, and ten thousands of yards in distance traversed and the device may be adjusted to cause closure of switch 194—196 when the aircraft on which the device is used has traveled any predetermined number of yards within the limits of the device.

The device may be detachably mounted within the casing or tube 56, the front plate 182 being provided with an enlarged circular portion 213 to serve as a guide and closure for the tube. The posts 197 and 198 may be prolonged to form plugs 214, 215 adapted to seat in metallic sockets 216, 217 mounted in a plug of insulation 218 mounted in tube 56. Conducting wires 219, 220 may be secured to the sockets 216, 217 for the purpose of connecting the switch 194—196 to any devices adapted to be controlled. In order to prevent accidental disconnection of the device and tube a manually releasable spring catch 221 may be secured to plate 182 and adapted to enter an opening 222 provided in tube 56 when the device is placed in said tube.

When the torpedo has travelled the predetermined distance for which the switch 194—196 is set the latter closes and causes energization of the relay 33. Engergization of the latter cuts out contact 19 and cuts in contact 54 thus causing the torpedo to descend. If desirable the driving engine 3 of the torpedo may be simultaneously rendered inoperative. This may be accomplished by providing a motor 57 in parallel with the relay 33, said motor being adapted, when energized, to close the valve 60 in the engine fuel-supply pipe 61. For this purpose said motor may be connected to the spindle of valve 60 by means of gears 58 and 59.

In order to keep the torpedo on a straight course i. e. to prevent the torpedo from changing course in a lateral direction I utilize a contact which is gyroscopically or otherwise fixed in azimuth. The follow-up heretofore considered necessary in connection with this lateral control may be dispensed with by employing a system somewhat similar to that described in connection with stabilization about the horizontal axes. The type of aircraft, shown in Figs. 1 and 2, having the major portion of its steering rudder 6 and tail piece 62' projecting above the shaft of the propeller 2, which is assumed to be rotating in the direction of the arrow, has an inherent azimuth bias to the left, looking forward along the longitudinal axis. By providing means, called into action on turning of the torpedo to the left, for causing said torpedo to turn to the right the latter may be made to hunt slightly to the right and left of a predetermined course and the follow-up may be dispensed with. Calling attention to lower half of Fig. 3, in which the azimuth gyro is located in plan, it will be seen that the contact segment 62, which is gyroscopically fixed in azimuth, is connected to solenoid 64 of the clutch 65 by means of a wire 66, the other end of said solenoid 64 being connected to line wire 22 by means of a wire 67. The clutch 65 may be identical to clutches 23, 23' and may be driven by the same motor 20. The contact 63 which cooperates with contact 62 and is carried by the torpedo is shown connected to the line wire 21 by means of a wire 68. The drum 69 is connected to rudder 6 by means of a cable 70 so that when a pull is exerted on said cable the rudder will be turned to cause the torpedo to turn in a direction contra to its bias. If desirable the inherent bias of the machine may be augmented by connecting a spring or other resilient element 71 at one end to said rudder and at the other end to the fuselage 1. The operation of this part of my invention is substantially as follows.

Assuming that the parts are in the position illustrated in the lower part of Fig. 3 the solenoid 64 will be energized to cause the rudder 6 to be thrown in such a direction to cause the torpedo to turn to the right. A slight turn to the right causes the contact 63 to disengage contact 62 to cause the solenoid 64 to be deenergized. The inherent bias of the torpedo, or the action of the spring 71 on the rudder 6, or both, then causes the torpedo to turn to the left until contacts 63, 62 reengage when the above operation is repeated. Thus the torpedo will hunt slightly to the right and left but will keep substantially on a straight course determined by the position of contact 62.

As previously mentioned the contact 62 is gyroscopically fixed in azimuth. This may be accomplished by pivotally mounting the frame 72, (see Fig. 5) of a gyroscopic rotor having a horizontal spinning axis 73, in a yoke 75, for oscillation about a horizontal axis 74 substantially at right angles to said spinning axis. The yoke 75, which is pivoted for relative rotation with respect to a frame 77, about a vertical axis, by means of pivots 76, 76 carries an arm 78 which in turn carries the contact 62. The contact 63 is preferably adjustably secured to the frame 77 for the purpose of angle firing. Thus the said contact 63 is shown carried by an arm 79 extending from a segmental worm wheel 80 pivoted on the upstanding stud 81 fixedly secured to the upper part of frame 77. The adjustment of the contact 63 may be effected manually by turning a crank 85 on a shaft 83 which has secured thereon a worm 82 meshing with worm wheel 80. The shaft 83 may be rotatably mounted in brackets 84 carried by the frame 77. The member 80 may be provided with a scale 86 calibrated to degrees and adapted to be read in conjunction with a pointer arm 87 carried by the stud 81.

By rotating the crank 85 the worm wheel 80 may be rotated clockwise or counterclockwise, depending on whether the desired turn is to be to the left or right, until the angle through which the device is desired to turn on launching is indicated on scale 86 under pointer 87. When the torpedo is then launched it will turn through the indicated angle, i. e. until the mean position of arm 79 with respect to contact 62 is as indicated in Fig. 3. This control may prove too abrupt especially for comparatively large angles and it may therefore be preferable to effect the turn gradually. The structure shown in Figs. 3, 5 and 6 may be employed to effect this result.

The shaft 83 has secured thereto a pair of ratchet wheels 88, 89 the teeth of one of said wheels being directed oppositely to those of the other. Each of said wheels 88, 89 is adapted to be engaged by a corresponding one of angularly disposed pawls 90, 91 fixedly secured on a rock shaft 92 rotatably mounted in a rod 93. The latter is adapted to be reciprocated by a solenoid 94 adapted to pull said rod against the action of a spring secured thereto at one end, the other end of said spring being secured to a hook 96 carried by bracket 97. The latter, which carries also the solenoid 94 is secured to the frame 77. A guide bracket 98 may be mounted on the bracket 97 in a position to guide the end of rod 93 opposite solenoid 94. A spring 99 is shown connected at one end to the pawl 91 and at the other end to a collar 100 loosely surrounding the shaft 83. The arm 87 may be used as a switch arm adapted to engage an arc shaped contact strip 101 carried by worm wheel 80. Said contact strip is provided with an insert of insulation 102 at its center. The arm 87 is shown connected to the segment 62 by means of a wire 103 and the strip 101 to the solenoid 94 by means of a wire 104, the other side of said solenoid being connected to the wire 67, through a switch 106, by means of wire 105. The operation of this feature may be briefly described as follows.

Assume that it is desired to set the mechanism to cause a 40° turn to the right and the parts are in the position shown in Fig. 3. The arm 87 should be turned on stud 81 in a counter-clockwise direction until it indicates 40 on scale 86 and the switch 106 closed. Closure of contacts 63—62, after launching of the torpedo will cause energization of solenoid 94 to cause the contact 63 to be moved slightly in a counter-clockwise direction about stud 81. The torpedo will then turn a few degrees to the right causing contacts 62, 63 to disengage to cause deenergization of solenoid 94 and deenergization of solenoid 64. The torpedo will then turn slightly to the left causing reengagement of contacts 63—62 to repeat the above operation. In short the contact 63 will be moved about stud 81 step-by-step until the insulation insert 102 passes under arm 87 in its adjusted position which will prevent further energization of the solenoid 94. The torpedo will thus execute a 40° turn to the right gradually and by degrees thus avoiding a sharp turn. Obviously angles other than that assumed above may be selected. In order to cause any turn to the left the pawl 90 should be thrown into engagement with its wheel 88, thus rendering pawl 91 inoperative, and the arm 87 should be turned about stud 81 in a clockwise direction in adjusting it.

It has been found, in practice, that a gyroscope has a more certain and reliable directive effect and operates better when its spinning axis is parallel to or at right angles to the course than when said axis is at some other angle. Furthermore as the time occupied in turning in angle fire, is small compared to the time the torpedo is on its straight final course, it is preferable to provide means for positioning the azimuth gyro with respect to its final course. This may be done by mounting the frame 77 on a pedestal 107 for rotation about a vertical axis with respect to said pedestal. While locking means might be provided the same function may be accomplished by so designing the parts to cause considerable friction between said frame 77 and pedestal 107. A pointer 108 may be provided on the frame 77 and adapted to cooperate with a scale 109 on the pedestal 107 to aid in adjusting the former.

The rotors of both gyros may be driven by any suitable means such as by three phase induction motors 110 and 111 of the type disclosed in United States Letters Patent to Elmer A. Sperry 1,186,856, patented June 13, 1916; gyroscopic apparatus. These motors are shown connected to three phase lines 112 which are connected to the three phase A. C. side of a double current wind-driven generator 113 mounted on the fuselage 1. The D. C. lines 21, 22 may be supplied from the D. C. side of said generator 113.

Prior to launching, the azimuth gyro 72 is locked to the frame 77 by means of a sleeve 114 which is held in telescopic engagement with the end of stud 73 against the action of a spring 115 by a catch 116 carried by an armature 118. A spring 117 is provided to bias the catch 116 to locking position. An electromagnet 119 is carried by the frame 77 in a position to attract the armature 118 to release the catch 116 and consequently the gyro when said electromagnet is energized. Energization of said electromagnet may be accomplished automatically at the proper time by connecting it in series with the front contacts of a retarded relay 120 across the line 21, 22. The last mentioned relay is also connected across the line 21, 22. The entire gyro equipment together with the servo motor may be placed in any suitable position on the torpedo as for example in a casing 121 in the fuselage.

The main explosive charge 122 of the torpedo is shown mounted in a tank or container 123 mounted in the fuselage 1 and while various forms of detonating means may be employed I prefer, at present, to use the type illustrated in Figs. 1 and 7. The container 123 is supplied with a central tube or sleeve 124 secured thereto and terminating at its top in an annular cap 125. The detonator is a unitary device adapted to be inserted into tube 124 and designated generally at 126. The tube or body portion 127 of the latter contains the detonating charge 128 and terminates at its upper end in a cup-shaped cap 129 adapted to contain the firing mechanism. Said cap 129 carries, depending from its bottom portion, the fulminate tube 130 and contains the blocks 131, 132 and a ball 133. The blocks 131, 132 which are freely slidable in a vertical direction in the cap 129 are normally pressed apart by a spring 134 secured to one of said blocks and engaging the other. The upper block 131 carries at its central portion a firing pin 135 adapted to strike a cap 136 carried by the block 132 to cause the latter to fire through the central aperture 137 in the last mentioned block to ignite the fulminate 130. The upper face of the block 131 and the lower face of a plug 138 adapted to close the upper end of cap 129 are conically recessed and the ball 133 is placed in the recess thus formed.

A clamp 139 may be provided for clamping the detonator to the container 123. In order to prevent premature and accidental explosion of the device before launching or while the torpedo is over home territory the cap 129 is provided with a side opening adapted to admit a rod 140 between the pin 135 and cap 136. Obviously the inertia of one or more of the members 131, 132, 133 will cause detonation when the descent of the torpedo is checked, as by striking the earth, regardless of the position the torpedo may occupy at that instant; assuming of course that the rod 140 has been withdrawn.

I provide means for arming the torpedo, i. e. for withdrawing the rod 140, after the torpedo has travelled a predetermined distance from the launching point. The rod 140 has pivotally connected thereto a connecting rod 141 which is connected at its other end to a crank pin 142 on a gear wheel 143 rotatably supported by the frame of motor 144. The gear 143 is adapted to be driven by the pinion 145 on the shaft of said motor. A knife switch 147 may be mounted on the base 146 of said motor in a position to be engaged and opened by a pin 148 on rod 141 when the rod 140 is in withdrawn position. The motor 144 is shown connected in series with the switches 194—196 and 147 across the line 21, 22. Obviously when the torpedo has travelled the distance for which the switch in tube 56 is set the latter closes and causes energization of motor 144. Energization of the latter withdraws the rod 140, the switch 147 opening after the latter is withdrawn to prevent the motor from causing reentry of said rod. The motor 144 may be mounted in a casing 149 on the torpedo.

The operation of my torpedo as thus far described may be briefly summarized as follows. The device 56 is set to the estimated distance to the target, contact 19 is set to the desired initial angle of climb or to the desired altitude as indicated on scale 53 and the azimuth gyro is set for the desired angle of fire. The engine 3 may then be started to cause rotation of the propeller 2, the torpedo being held. Generator 113 will then build up and cause the gyro rotors to spin up substantially to speed. The front contacts of relay 120 then close to cause unlocking of the azimuth gyro. The torpedo may then be released and will go forward, rise from the launching truck and continue to rise until the altitude for which it was set is reached, when the flight will level off. Immediately upon launching the torpedo, if it has been set for angle fire, will begin to turn and will continue to turn until it has turned through the angle to which the azimuth gyro was set. The torpedo will then be stabilized and held on its course until the switch in tube 56 closes. Closure of the latter will arm the torpedo, cut out the engine and cause the torpedo to descend. When the torpedo hits the earth the main charge will be exploded as previously set forth.

My invention as above disclosed is susceptible to various modifications. Thus instead of controlling the arming motor 144 by the distance responsive switch in controller tube 56, the former may be controlled by a supplemental distance responsive controller 56' (see Fig. 8). The latter may be set to close as soon as the torpedo reaches enemy territory which may be considerably sooner than the closure of the switch in controller tube 56. With this arrangement if the machine descends or is brought down before the specific intended target is reached it will explode, so that the chance of doing damage to the enemy is greatly enhanced.

Instead of utilizing relay 33 and contact 54 to bring the torpedo down means may be provided for causing the fuselage 1 to drop away from the main planes 4 and 5. One form of such means is shown in Figs. 2, 8, 9, 10 and 11 and may be constructed substantially as follows.

The two lower beams of the main plane 5 which pass through the fuselage 1 are each shown as formed in three sections 150, 151 and 152 joined by interlocking ends as shown in Fig. 11. Sleeves 153 are provided for the joints so formed to impart rigidity to the latter. As the mechanism for releasing the fuselage from the beam portions 150, 152 at the rear of plane 5 is the same as that for the front beam a description of one of said mechanisms, as shown in Fig. 10, will suffice. The sleeves 153 are shown connected by a spring 154 which tends to actuate them to releasing position. A pair of links 155 pivotally connected to each other at one end at 157 are each connected at their other ends to a corresponding one of sleeves 153. The normal position of the parts is as shown in Fig. 10 with the links 155 slightly to one side of center position and in engagement with pins 156 provided on a plate 160 secured to and carried within the fuselage 1. A solenoid 159 may be mounted on the plate 160, the core or plunger 158 thereof being pivotally connected to the links 155 for the purpose of tripping the latter to allow the spring 154 to actuate the sleeves 153 to releasing position.

I prefer, also, to provide devices for releasing the guy wires from the fuselage 1.

All of the devices may be similar and may assume the form illustrated in Fig. 9. A pair of spaced angle brackets 161, 162 are suitably secured to the fuselage 1 and are provided with openings in which the core 164 of a solenoid 163, secured to the bracket 161, is adapted to slide. Guy wires 166 may be secured to a ring 167 through which the plunger 164 may be inserted as shown in Fig. 9. A spring 165 may be provided for normally holding the plunger 164 in the position shown. On energization of solenoid 163 the plunger 164 is withdrawn to release the ring 167 and thereby release the guy wires 166 from the fuselage. As many of the devices shown in Fig. 9 are provided as are necessary, four being indicated diagrammatically in Fig. 8.

Referring to Fig. 8 it will be seen that with this form of the invention the contact or trolley 54 and relay 33 may be dispensed with and the contact 19 connected directly to line wire 21. The solenoids 159 and 163 are shown connected in parallel with each other and in series with the controller 56 across the line.

The operation of the last described form of my invention is substantially the same as that of the form previously described up to the time of closure of the switch in controller 56, except that the arming of the controller 56, except that the arming of the auxiliary torpedo is accomplished by the auxiliary switch 56', as already described. When the distance at which the device has been set is traveled by the torpedo, operation of said controller 56 causes energization of solenoids 159 and 163. Energization of the last mentioned solenoids causes the connections between the main planes 4 and 5 and the fuselage 1 to be broken so that the body or fuselage 1 will drop quickly and vertically downward. The cables 39 may be so designed as to break or run off drum 30' when the fuselage 1 drops away from the supporting planes.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I desire to secure by Letters Patent is:

1. In an aerial torpedo or other automatically controlled aircraft, a flight controlling gyroscope, means controlled thereby for normally turning the torpedo in one direction, and means otherwise controlled for turning the torpedo in the other direction.

2. In an aerial torpedo, a flight controlling gyroscope, means controlled thereby for causing the torpedo to ascend, and means otherwise controlled for causing it to descend, said two means being adapted to alternately assume control when flying substantially level.

3. In combination, a dirigible device, a control element therefor stabilized about at least one axis, a second control element carried by said device and adapted to cooperate with said first mentioned control element, means responsive to the height of said device for progressively shifting said second element in a predetermined direction with respect to said device.

4. In a torpedo, a stabilized control element, a second control element cooperable and movable with respect to said first mentioned element, steering means controlled by said control elements and a barometric device mechanically connected to said second control element for actuating the same.

5. An aerial torpedo comprising a propelling motor, a device actuated by the travel of said torpedo through the air and means controlled by said device for rendering said motor inoperative.

6. In an aerial torpedo or other automatically controlled aircraft, a plurality of gyroscopes for governing the flight of the torpedo in azimuth and in elevation, means controlled by the first named gyroscope for normally turning the torpedo in one direction, means controlled by the second named gyroscope for normally causing said torpedo to ascend, and means controlled otherwise than from said gyroscopes for causing said torpedo to turn in the opposite direction and to descend.

7. In combination, a dirigible device, a control plane therefor, resilient means for operating said plane in one direction, a servo-motor for operating said plane in the opposite direction and a gyroscope for controlling said servo-motor.

8. In combination, a dirigible device, a control plane therefor, resilient means for operating said plane in one direction, a servo-motor for operating said plane in the opposite direction, a gyroscope for controlling said servo-motor and a height responsive device for changing the effective relationship between said gyroscope and said servo-motor.

9. An aerial torpedo comprising an elevator, a plurality of contacts, one of which is gyroscopically stabilized, for controlling said elevator and means responsive to the height of said torpedo for shifting one of said contacts with respect to another.

10. An aerial torpedo comprising an elevator, a plurality of contacts, one of which is gyroscopically stabilized, for controlling said elevator and means including a barometric device responsive to the height of said torpedo for shifting one of said contacts with respect to another.

11. An aerial torpedo comprising propelling means, an explosive charge, and means responsive to the travel of said torpedo for first arming said torpedo and for later rendering said propelling means inoperative.

12. An aerial torpedo comprising propelling means, means for maintaining said torpedo above a predetermined height and means responsive to the travel of said torpedo for rendering said two first named means inoperative.

13. An aerial torpedo comprising an explosive charge, means responsive to the travel of said torpedo for arming the same, propelling means for said torpedo, means for maintaining said torpedo above a predetermined height and means responsive to the travel of said torpedo for rendering said last mentioned means and said propelling means inoperative.

14. In a torpedo, a plurality of relatively movable control elements, means for stabilizing one of said control elements and a barometric device mechanically connected to one of said control elements for actuating the same.

15. In an aerial torpedo, means comprising a control element for governing the angle of ascent of said torpedo and means comprising a barometric device for continuously shifting said control element until said torpedo reaches a predetermined height.

16. In an aerial torpedo, comprising a body adapted to contain an explosive charge, propelling means for said body, an elevating plane for said body, means responsive to the distance of travel of the same, and means operated by said last named means for actuating said elevating plane and for stopping the propelling means.

17. In combination with an aircraft having propelling means, rotatable wind driven means for rendering said propelling means inoperative, upon said means completing a predetermined number of revolutions.

18. In combination with an aircraft having power actuated propelling means, of rotatable means driven by the passage of the aircraft through the air for cutting off the supply of power from said propelling means, after a predetermined number of revolutions of said rotatable means.

19. In combination with an aerial torpedo having propelling means, an explosive charge carried by said torpedo, and wind driven means responsive to the travel of said torpedo for arming the latter and for rendering the propelling means inoperative.

20. In combination with an aerial vehicle having propelling means, means for maintaining said vehicle above a predetermined height, and wind driven means responsive to the travel of the torpedo for rendering said two first named means inoperative.

21. The combination with an aircraft, of wind driven distance responsive means for changing the direction of flight of said aircraft.

22. The combination with an aircraft of means for controlling the flight of said aircraft in a vertical plane, and wind driven distance responsive means for varying the action of said first named means.

23. The combination with an aircraft, of wind driven distance responsive means, and means controlled thereby for affecting the flight of the aircraft.

24. In an aerial torpedo, the combination with an electrically rotated gyroscope for controlling the same, a locking means for locking the gyroscope against precession prior to launching, a generator on the torpedo for rotating said gyroscope, and delayed action means brought into action by the current from said generator for unlocking said gyroscope.

25. Controlling apparatus for a vehicle, adapted for movement in a sustaining medium, comprising the combination with propelling means, a direction controlling means, and an elevation controlling means; of means for automatically actuating said direction controlling means; means for automatically actuating said elevation controlling means, and means for stopping the propelling means after the vehicle has traveled a predetermined distance, said last means including a wind wheel whose total number of revolutions is dependent upon the actual air distance flown by the vehicle.

26. Controlling apparatus for a self-propelled vehicle, adapted for movement in a sustaining medium, comprising the combination with a propelling means, a direction controlling means, and an elevation controlling means; of means for operating said direction controlling means to control the direction of flight of said vehicle, and a direction indicating mechanism for actuating said means; means for operating said elevation controlling means, to control the elevation of the vehicle in the sustaining medium, and means responsive to variations in elevation for actuating said second-named operating means; and means associated with the propelling means for automatically stopping the operation of such propelling means after the vehicle has traveled a predetermined distance, said last-named means comprising a wind wheel whose total number of revolutions is dependent upon the air distance flown and independent of the propelling means.

27. Controlling apparatus for a vehicle, adapted for movement in a sustaining medium, comprising the combination with a propelling means and mechanism adapted to control the elevation of the vehicle within said medium; of means associated with the elevation control mechanism for controlling movement of such vehicle out of the horizontal, so long as a predetermined altitude is not maintained, and other means associated with the elevation controlling mechanism adapted to maintain the vehicle at the predetermined elevation when such elevation is attained.

28. Controlling apparatus for a vehicle, adapted for movement in a sustaining medium, comprising the combination with mechanism adapted to control the movement of the vehicle relative to the vertical; of means for actuating said mechanism adapted to control the angular movement of said vehicle relative to the vertical, said means including a gyroscope; and other means for actuating said mechanism and adapted to function at a predetermined elevation and to maintain the vehicle at that predetermined elevation, said last-named means including an altimeter.

29. Controlling apparatus for a self-propelled vehicle, comprising the combination with propelling means, of means for automatically stopping the propelling means after the vehicle has traveled a predetermined distance, said means including an air distance recording wind wheel independent of the propelling means.

30. In a self-controlled airplane, means including a gyroscope and a barometric device for governing the angle of ascent and the height of the flight, and means including a gyroscope and a delayed-action angle fire device for governing the direction of the flight thereof.

In testimony whereof I have affixed my signature.

LAWRENCE BURT SPERRY.